Patented Aug. 17, 1954

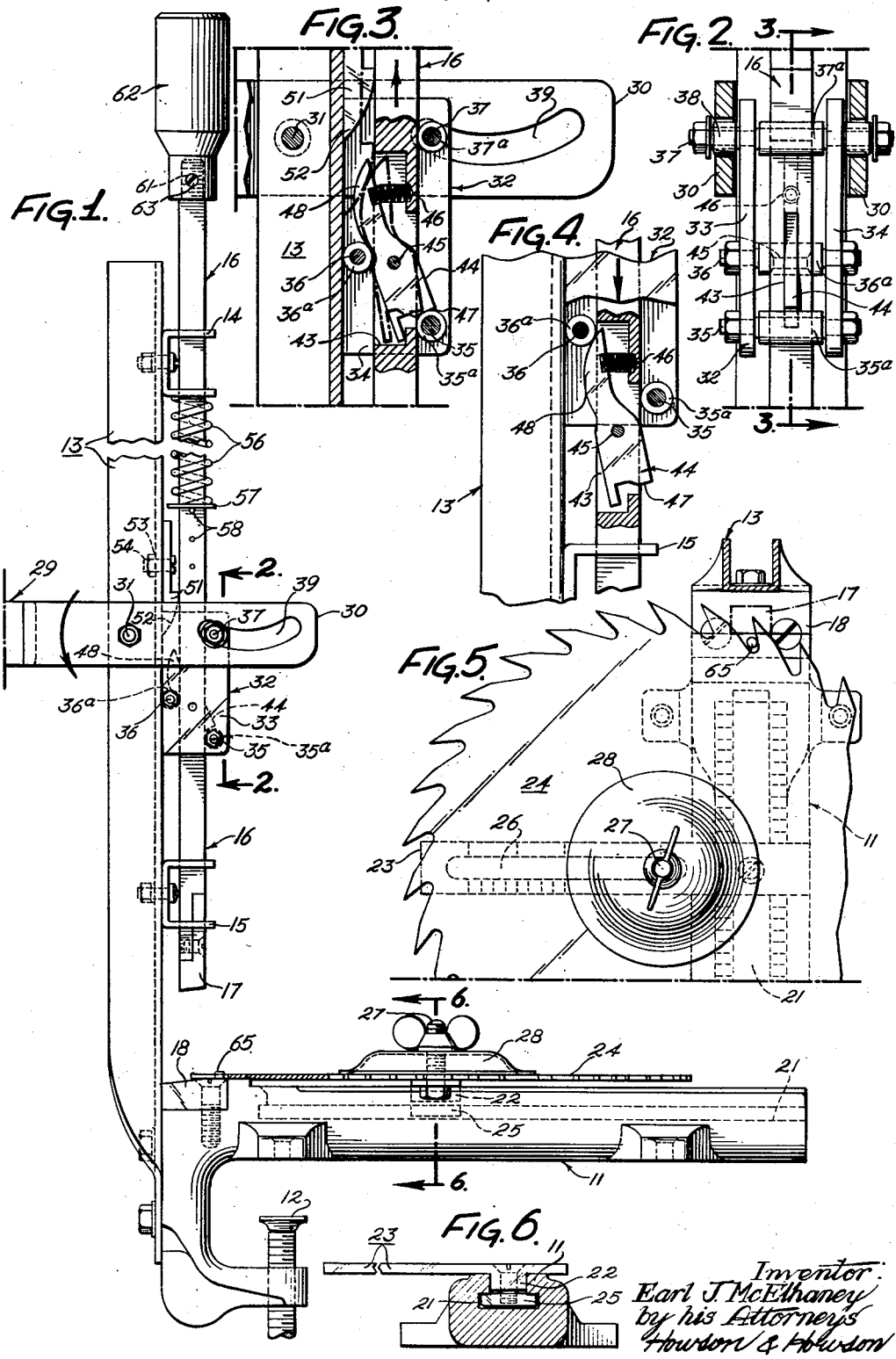

2,686,438

UNITED STATES PATENT OFFICE 2,686,438

SAW TOOTH SETTING MACHINE

Earl J. McElhaney, Chambersburg, Pa.

Application May 29, 1953, Serial No. 358,247

3 Claims. (Cl. 76—67)

1

The present invention relates to a machine for setting the angle of saw teeth, and more particularly to a machine of this type which is adapted to be clamped on a work bench and operated by a relatively unskilled artisan.

Prior to the present invention, there has not been available an inexpensive and foolproof machine for setting the teeth of saws.

Existing machines for this purpose are large and expensive, and usually are constructed to accommodate a single type and size of saw. To set the teeth of saws of different type and size, such machines require substantial modification, and consequently, they are not practical for amateur workmen whose tool chests usually include a wide variety of saws which require setting at sporadic intervals. Therefore, the usual practice has been to set each tooth of the saw individually with a block and anvil and a hand hammer. This method is not completely satisfactory since it is difficult to obtain uniform impacts on all teeth of the saw, and it is also difficult to obtain the proper angle of set for each tooth. As a result, all of the teeth are not set uniformly.

With the foregoing in mind, a primary object of the present invention is to provide a novel inexpensive and easily-operated machine for setting the teeth of a saw.

A further object is to provide a manually-operated saw tooth setting machine which insures a uniform impact on each tooth and the correct angle of set thereof.

Another object of the invention is to provide a machine of the character set forth wherein the impact on the tooth is effected by a spring-biased shaft, the impact of which is adjustable in accordance with the force required to bend the saw tooth.

More specifically, the invention contemplates a saw tooth setting machine of the type described wherein the weight and the spring bias of the impact shaft, and the length of its stroke are individually adjustable within predetermined limits.

These and other objects of the invention and the various features and details of the construction and operation thereof are more fully set forth hereinafter with reference to the accompanying drawing in which:

Fig. 1 is a side elevational view of a saw tooth setting machine made in accordance with the present invention;

Fig. 2 is a vertical sectional view taken on the line 2—2 of Fig. 1;

2

Fig. 3 is a transverse sectional view taken on the line 3—3 of Fig. 2 showing the impact shaft in its upward travel;

Fig. 4 is a fragmentary view similar to the view of Fig. 3 showing the impact shaft in its lower limit position;

Fig. 5 is a fragmentary plan view illustrating the position of the saw blade on the supporting bracket of the machine; and, Fig. 6 is a sectional view taken on the line 6—6 of Fig. 1.

The saw tooth setting machine of the present invention comprises a frame having a base which is adapted to be clamped on a work bench and an upright member which supports an impact shaft for vertical sliding movement relative to the frame. The lower end of the shaft is provided with a hammer head which cooperates with a hardened anvil inset in the base member. The shaft is spring-loaded to assist its downward impact motion and is provided with means for securing an auxiliary weight to the top thereof for increasing the impact of the hammer head upon the anvil. The shaft is actuated by a hand lever which is pivotally attached to a carriage slidably embracing the shaft and cooperating with a pawl which releasably locks the carriage to the shaft to effect movement of the latter. Means is provided on the upright member to automatically release the pawl at a predetermined point in the upward travel of the shaft. In this manner, the downward impact of the shaft will be constant for each setting operation.

Referring more specifically to the drawing, the base 11 of the machine frame is adaptd to be releasably secured to a work bench, for example, by a clamp indicated at 12. Bolted to the base and extending vertically upward therefrom, is an upright channel member 13. Secured adjacent the upper and lower extremities of the channel upright 13 are outwardly projecting apertured brackets, 14 and 15 respectively, which support an impact shaft 16 for vertical sliding movement. The lower extremity of the impact shaft is provided with a hardened hammer head 17 which engages against an anvil piece 18 inset in the base member 11. The confronting faces of the hammer 17 and the anvil 18 are inclined, as indicated, to provide the proper angle of set to the teeth of a saw. The hammer and anvil are removable as indicated in the drawing and are readily replaceable with others having faces at different angles for producing different angles of set of the teeth.

In accordance with the invention, the saw is accurately positioned on the base 11 so that the saw tooth which is to be set rests upon the anvil at the correct position for imparting the proper set to the tooth. To this end, the base is provided with an elongated T-shaped groove 21 which snugly receives a depending lug 22 of a cross arm 23 for supporting a circular saw blade, indicated at 24 in Figs. 1 and 5. The lug 22 is rectangular in shape and fits nicely within the groove 21 to maintain the arm 23 at right angles to the base 11. The arm is clamped in position by a nut 25 which seats in the enlarged portion of the T-shaped groove 21, and is provided with a longitudinal recess 26 which receives the shank of a bolt 27 upon which the saw blade 24 is placed. A dished washer and a cooperating wing nut firmly clamp the saw blade on the arm 23 as indicated at 28. As seen in Fig. 5, the groove 21 and the recess 26 are provided with calibrations by means of which the desired location of the saw blade may be determined. Preferably, the calibrations are graduated and indexed for the various standard saw blade diameters so that the saw blade may be properly positioned simply by registering the arm 23 with the proper calibration of the groove 21, and the bolt 27 with the proper calibration of the recess 26. An upwardly projecting indexing pin 65 is provided on the anvil 18 against which the gullet of the tooth is positioned to insure that the tooth is properly positioned over the anvil to impart the proper angle of set. If desired, the pin 65 may be spring-mounted for depression manually out of the path of the saw tooth.

The impact shaft 16 is actuated by a hand lever 29 having bifurcated end portions 30, 30. The end portions 30 straddle the upright 13 and are pivoted thereto as indicated at 31. A carriage 32 is pivoted between the outer extremities of the end portions 30, 30 as described more fully below, and is slidably mounted on the impact shaft 16. The carriage, in the present instance, comprises side plates 33 and 34 respectively, which are maintained in spaced relation by a plurality of studs 35, 36, and 37 respectively. The studs rotatably mount rollers 35a, 36a, and 37a respectively, and the rollers are positioned to engage against the opposite faces of the impact shaft 16 as clearly illustrated in Figs. 1 and 3. Thus, the carriage is made slidable vertically longitudinally of the shaft. The upper stud 37 of the carriage also rotatably mounts rollers 38 at opposite sides of the plates 33 and 34. These rollers 38 are loosely engaged in arcuate slots 39 of the bifurcated end portions of the hand lever 31, so that by simple actuation of the lever about its pivot 31, the carriage 32 may be raised and lowered.

In accordance with the invention, the shaft is releasably engaged with the carriage during the upward travel of the latter, and means is provided to release the engagement at a predetermined point in the upward travel thereby permitting the shaft to slide downwardly in the brackets 14 and 15, so as to drive the hammer head 17 against the anvil portion 18. To this end, the shaft 16 is provided with a longitudinal opening 43 in which a pawl 44 is pivotally mounted as indicated at 45. The pawl 44 is dimensioned to fit completely within the opening 43 when in alignment therewith, but is biased outwardly as indicated in Figs. 4 and 5 by means of a spring 46. As seen in Figs. 3 and 4, the lower edge of the pawl is provided with a foot portion 47 which, when the pawl is in its normal outwardly biased condition, engages against the upper surface of the roller on the stud 35 of the carriage to lock the latter to the shaft. The opposite exposed face of the pawl 44 is formed as indicated at 48 to engage against the roller on the stud 36. In this manner, when the carriage 32 is moving downwardly relative to the shaft 16, the surface 48 will be engaged by the roller 36 to rock the pawl into alignment within the opening 43 of the shaft 16 (see Fig. 4). As the roller passes the high point of the surface 48, the pawl will rock outwardly as a result of the spring bias 46, and the foot 47 will engage over the roller 35.

To release the shaft from the carriage during their upward travel, a cam member 51 is secured to the upright member 13. The lower face 52 of the cam member serves as a cam surface to engage the surface 48 of the pawl 44 and to rock it into alignment with the shaft 16 thereby disengaging the foot 47 from the roller 35 and permitting the shaft 16 to fall downwardly. The cam 51 is adjustable vertically on the upright member 13 to determine the point at which the shaft will be released from the carriage 32. To this end, the cam is provided with a longitudinal slot as indicated at 53 and is retained on the upright member by a bolt 54 engaging in the slot 53.

To provide an impact, the shaft 16 is resiliently biased downwardly. To this end, a spring 56 encircles the shaft, seating at its upper end against the lower surface of the bracket 14 and at its lower end against a washer 57 secured to the shaft by a pin 58. The shaft is provided with a plurality of apertures to receive the pin 58 so that the initial compression of the spring between the bracket 14 and the washer 57 may be regulated to control the impact force by suitable selection of the aperture in which the pin 58 is placed.

To provide further regulation of the impact force on the anvil portion 18, the upper extremity of the shaft is threaded as indicated at 61 to receive an auxiliary weight 62. The weight is threaded on the upper extremity of the shaft and secured in place by a set screw 63 so that weights of different size may be secured in place to increase the impact of the hammer on the anvil.

The impact of the shaft is dependent upon the weight of the shaft, the spring force, and the length of the stroke of the spring-biased impact shaft. It should be noted that the weight of the shaft may be regulated by selection of a proper auxiliary weight 62, the spring force by regulation of the initial compression of the spring, and the stroke by vertical adjustment of the cam element 51.

In operation of the device, the saw blade 24 is secured on the base 11 by positioning the arm 23 in accordance with the graduations of the groove 21 and the bolt 27 in accordance with the graduations in the recess 26. As stated above, these graduations will be calibrated in accordance with given saw blade diameters, and it is a simple matter to adjust the position of the saw blade properly. The hand lever 29 is then raised to its full clockwise position, causing the carriage 32 to travel downwardly on the shaft 16 and engage the pawl 44 of the shaft as described above. When the carriage is engaged on the shaft by the action of the pawl 44, the hand lever is then pivoted counterclockwise as seen in Fig. 1 to raise the carriage and the shaft 16 in the brackets 14 and 15 against the bias of the spring 56. When the carriage is raised to an extent that the pawl 44 engages the cam 52, the pawl is rocked into alignment with the shaft 16 and is disengaged from the carriage 32. The shaft 16 is actuated downwardly under the bias of the spring 56 and the weight 62, causing the hammer head 17 to impinge against the saw tooth which is positioned over the anvil portion 18. It should be noted that the saw tooth is insured of proper position by the upwardly projecting positioning pin 65 on the anvil portion 18. The impact of the hammer head 17 on the tooth will bend it to the proper set. The saw blade is then rotated about the bolt 27 a distance corresponding to the spacing of two teeth, to thereby position the second succeeding tooth on the anvil portion 18. The tooth is again properly positioned on the anvil by its engagement with the indexing pin 65. The described operation is repeated until alternate teeth of a saw blade have set.

When the alternate teeth have been set, the wing nut 28 is released and the saw blade 24 is removed from the arm 23. The arm 23 is then released from engagement with the groove 21 and turned 180 degrees and secured at the opposite side of the base in registration with the proper calibration on the groove 21. The saw blade is then replaced on the arm 23 with the reverse side facing upwardly. The proper position of the saw blade on the arm is again determined by the calibrations on the recess 26, and the remaining teeth of the blade are set in the manner described above. When this has been done, the teeth of the saw blade will be properly set with the adjacent teeth of the blade projecting outwardly from the plane of the saw in opposite directions.

While the invention has been described with particular reference to circular saw blades, it is not intended to limit the invention to such disclosure. For example, the base structure may be modified to accommodate conventional hand saws. In addition, other changes and modifications may be made therein and thereto without departing from the present invention as defined in the appended claims.

I claim:

1. A saw tooth setting machine comprising a frame having a base provided with an anvil portion, means to dispose a saw tooth upon said anvil portion, an impact shaft mounted for vertical movement in alignment with said anvil portion and having a hammer head mounted at its lower end, spring means biasing the shaft downwardly into impact engagement with a saw tooth on said anvil portion, a carriage associated with said impact shaft slidably mounted for relative vertical movement thereon, a pawl pivoted within said shaft and normally biased outwardly into engagement with said carriage to interlock the shaft and the carriage, means to raise said carriage and the shaft relative to the base, and a cam adjustable vertically on said frame and projecting outwardly into the path of said outwardly biased pawl and operable upon a predetermined elevation of said shaft to displace the pawl inwardly thereof to release the interlock and thereby cause said shaft to be actuated downwardly and effect impact engagement of the hammer head with a saw tooth on the anvil portion of the base.

2. A saw tooth setting machine comprising a frame having a base provided with an anvil portion, means to dispose a saw tooth on said anvil portion, impact means mounted for vertical movement in vertical alignment with said anvil portion and having a hammer head mounted at its lower end, means on said frame to slidably receive said impact means and to guide the hammer head into impact engagement with a saw tooth on said anvil portion, spring means biasing said impact means downwardly, a carriage slidably mounted on said impact means for relative vertical movement with respect thereto, a pawl pivoted within said impact means and normally biased outwardly into engagement with said carriage to interlock the same, a hand lever pivoted at its center to said frame and engaged at one end with said carriage and operable upon pivotal movement to displace the carriage and the impact means vertically relative to the base, and a cam adjustable vertically on said frame projecting outwardly into the path of said outwardly biased pawl and operable upon a predetermined elevation of said shaft to displace the pawl inwardly thereof to release the interlock thereby causing the impact means to be actuated downwardly and cause impact engagement of the hammer head with a saw tooth on the anvil portion of the base.

3. A saw tooth setting machine comprising a frame having a base provided with an anvil portion, means to dispose a saw tooth on said anvil portion, an impact shaft mounted for vertical movement in vertical alignment with said anvil, and having a hammer head mounted at its lower end, means on said frame to slidably receive said shaft and to guide the hammer head into impact engagement with a saw tooth on said anvil portion, a spring compressed between said frame and said shaft biasing the latter downwardly into impact engagement with the saw tooth on said anvil portion, means to adjust the normal compression of said spring, a carriage slidably mounted on said shaft for relative vertical movement with respect thereto, a pawl pivoted within said shaft and normally biased outwardly into engagement with said carriage to interlock the shaft to the carriage, a hand lever pivoted at its center to said frame and engaged at one end with said carriage and operable upon pivotal movement to raise the carriage and the shaft vertically relative to the base, and a cam mounted for vertical adjustment on said frame and projecting outwardly into the path of said outwardly biased pawl and operable upon a predetermined elevation of said shaft to displace the pawl inwardly thereof to release the interlock and cause said shaft to be actuated downwardly under the bias and effect impact engagement of the hammer head with a saw tooth on the anvil portion of the base.

References Cited in the file of this patent

UNITED STATES PATENTS

| Number | Name | Date |
| --- | --- | --- |
| 42,581 | Hotchkiss | May 3, 1864 |
| 467,159 | Crapson | Jan. 19, 1892 |
| 645,608 | Schake, Jr. | Mar. 20, 1900 |
| 656,135 | Hamlett | Aug. 14, 1900 |
| 1,082,685 | Dyer | Dec. 30, 1913 |
| 1,190,657 | Kollock et al. | July 11, 1916 |
| 1,592,610 | Meszaros | July 13, 1926 |
| 1,695,684 | Eaton | Dec. 18, 1928 |